April 5, 1927.
S. A. LIND
TOOL
Filed May 12, 1924
1,623,689
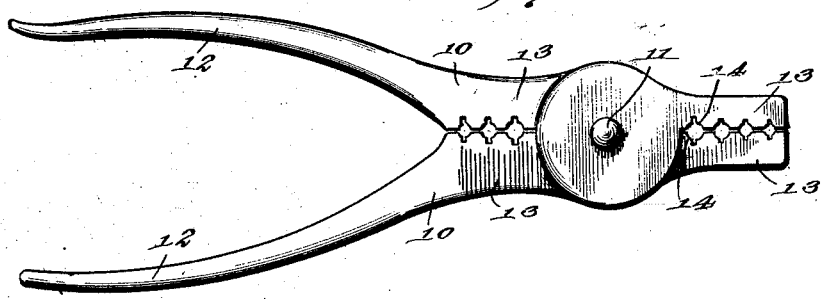
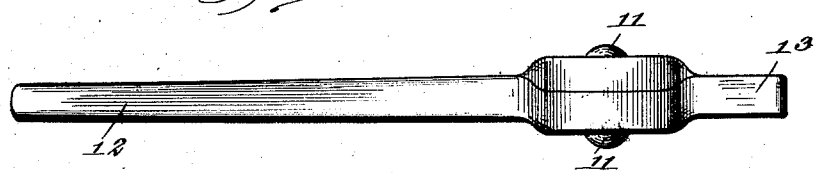
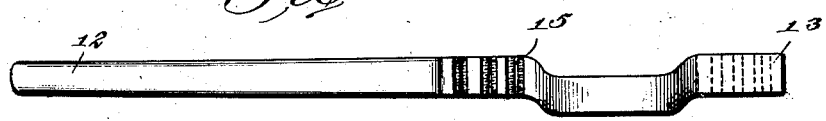
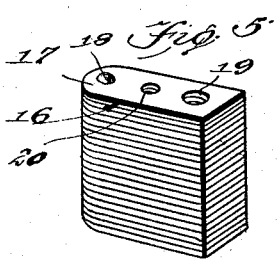
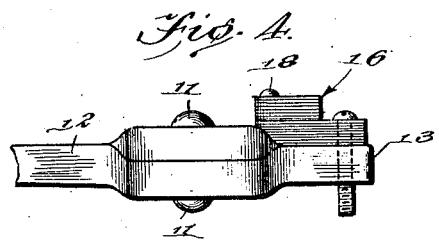
WITNESSES
INVENTOR
S. A. Lind,
BY
ATTORNEYS Patented Apr. 5, 1927.

1,623,689

UNITED STATES PATENT OFFICE.

SEBERT A. LIND, OF ALAMEDA, CALIFORNIA.

TOOL.

Application filed May 12, 1924. Serial No. 712,618.

This invention relates to an improvement in tools for use in severing screws, bolts or the like to shorten or produce a screw, bolt or the like of the desired length.

The object of the invention is to provide a tool of this character especially designed for use in conjunction with threaded parts so as to enable a portion of the screw or threaded bolt to be cut off to produce the desired length of the screw or bolt without injuring the threads of the portion of the screw intended to be used.

Another object is to provide a tool of this character and having these advantages and capacities and which greatly facilitates the operation of severing the screw, bolt or the like, and which is also of simple and durable construction, reliable in operation and easy and inexpensive to manufacture.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view in side elevation, showing one embodiment of the invention;

Figure 2 is a view thereof in top plan;

Figure 3 is a plan view of one of the members of the tool;

Figure 4 is a view showing the manner in which the stop coacts with the tool and with the screw, bolt or the like;

Figure 5 is a detailed perspective view of the stop or device employed for preventing axial movement of the screw, bolt or the like.

Referring to the drawings it will be seen that the tool comprises a pair of members 10 pivotally connected to each other as at 11 and having handles 12 whereby the members may be swung about the pivot 11. Pairs of jaws designated at 13 are provided on the members 10 and each pair of jaws 13 are formed with a plurality of complementary thread engaging faces or recesses 14. The complementary thread engaging faces 14 are of different sizes to accommodate different sized bolts, screws or the like. Each face 14 is of uniform width from end to end as clearly shown in Fig. 3 and is also formed with a lengthwise slot 15 which enhances the gripping action of the face. As shown in the drawings the complementary faces 14 are also formed with threads designed to snugly fit and engage the threads of the screw, bolt or the like to be severed. With this arrangement the screw which is to be shortened or severed to produce the desired length is engaged with the complementary thread engaging faces 14 of the size to fit the screw. The portion of the screw which is intended to be used is engaged by the faces 14. The portion of the screw which is to be removed is gripped in a vise or in any suitable form of pliers having roughened jaw faces and the screw is then twisted so that it will break off at the point where it projects from the tool constituting the present invention. The threaded faces 14 of the tool are usually adequate to hold the screw against turning for these faces frictionally engage the threads of the screw and the edges provided by the slot 15 enhance the gripping action of these faces. In some cases however it has been found that the screw is turned to some extent relative to the face 14 and of course in order to turn it must advance or move axially since the faces 14 of the jaws 13 act as a nut. In order to prevent such turning, it is proposed to hold the screw against axial movement, and for this purpose the stop or device designated generally at 16 in Figures 4 and 5 is provided.

The stop 16 consists of a plurality of thin plates 17 which are of a predetermined thickness and which are pivotally connected, as at 18. When all of the plates are alined with each other, as shown in Figure 4, the openings 19 and 20 of the several plates are registered. These openings are designed to receive bolts, screws or the like of different sizes. Of course, the number of plates used in any instance depends on the length of the screw to be severed. As shown in Figure 4 the plates which are not used are swung away and the screw is passed through the alined openings 19 or 20 of the remaining plate, the head of the screw being engaged with the topmost plate. The lowermost plate engages the jaws coacting with the screws. In this way the stop or device 16 serves to prevent axial movement of the screw, bolt or the like, and as the screw, bolt or the like must move axially in order to turn, the screw, bolt or the like is effectively held against movement relative to the jaw faces 14.

I claim:

1. A tool for use in severing screws, bolts or the like comprising a pair of jaws having complementary thread engaging faces designed to grip the threads of the screw or bolt, and a device cooperable with the jaws for preventing axial movement of the screw, bolt or the like, said device comprising a plurality of pivoted plates having openings designed to receive a screw, bolt or the like.

2. A tool for use in severing screws, bolts or the like comprising a pair of pivoted members, each pivoted member having a handle and a jaw, each jaw having a thread engaging face extending transversely thereof, the thread engaging faces of the jaws being designed to grip the threads of the screw bolt when the handles are gripped, and a device co-operable with the jaws for preventing axial movement of the screw, bolt, or the like and comprising a plurality of pivoted plates having openings designed to receive the shank of the screw or bolt, the device being engageable with the jaws at one side.

SEBERT A. LIND.